US012620148B2

(12) United States Patent
Meisarosh et al.

(10) Patent No.: US 12,620,148 B2
(45) Date of Patent: May 5, 2026

(54) ROLLOUT PHOTOGRAPHY SYSTEMS AND METHODS FOR MOBILE DEVICES

(71) Applicant: QUALCOMM Incorporated, San Diego, CA (US)

(72) Inventors: Edward Jacob Meisarosh, La Jolla, CA (US); Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 18/363,870

(22) Filed: Aug. 2, 2023

(65) Prior Publication Data

US 2025/0047802 A1    Feb. 6, 2025

(51) Int. Cl.
| | |
|---|---|
| *G06T 11/40* | (2006.01) |
| *G06T 1/00* | (2006.01) |
| *G06T 3/18* | (2024.01) |
| *G06T 7/174* | (2017.01) |
| *G06T 7/55* | (2017.01) |
| *H04N 23/60* | (2023.01) |
| *H04N 23/63* | (2023.01) |

(52) U.S. Cl.
CPC ............ *G06T 11/40* (2013.01); *G06T 1/0007* (2013.01); *G06T 3/18* (2024.01); *G06T 7/174* (2017.01); *G06T 7/55* (2017.01); *H04N 23/631* (2023.01); *H04N 23/64* (2023.01); *G06T 2207/20221* (2013.01)

(58) Field of Classification Search
CPC . G06T 11/40; G06T 7/55; G06T 7/174; G06T 3/18; G06T 1/0007; G06T 2207/20221; H04N 23/64; H04N 23/631
See application file for complete search history.

(56) References Cited

U.S. PATENT DOCUMENTS

| | | | | |
|---|---|---|---|---|
| 6,088,527 A * | 7/2000 | Rybczynski | ......... | H04N 23/695 348/E5.022 |
| 6,639,625 B1 * | 10/2003 | Ishida | ................... | H04N 1/0432 348/E5.053 |
| 8,456,513 B2 * | 6/2013 | Raynor | ................ | H04N 23/698 348/39 |
| 11,315,217 B2 * | 4/2022 | Ilic | ........................ | G06T 3/4038 |
| 12,309,333 B2 * | 5/2025 | Ilic | ........................ | H04N 13/275 |
| 2005/0068544 A1 * | 3/2005 | Doemens | ........... | G01B 11/2522 356/601 |
| 2007/0285562 A1 * | 12/2007 | Raynor | ................ | H04N 23/698 348/373 |
| 2009/0022422 A1 * | 1/2009 | Sorek | ................... | H04N 1/3876 382/284 |

(Continued)

*Primary Examiner* — Stephen R Koziol
(74) *Attorney, Agent, or Firm* — Polsinelli LLP/QUALCOMM Incorporated

(57) ABSTRACT

Systems and techniques are described herein for rollout photography for mobile devices. For example, a computing device (e.g., a mobile device) can obtain, from a camera, a plurality of image frames of an object while at least one of the apparatus or the object is moving relative to each other. The computing device can determine a plurality of image segments from the plurality of image frames of the object. The plurality of image segments include a respective image segment from each image frame of the plurality of image frames. The computing device can combine the plurality of image segments to generate a single two-dimensional (2D) image of a surface of the object.

30 Claims, 13 Drawing Sheets

(56)                    References Cited

U.S. PATENT DOCUMENTS

| | | | |
|---|---|---|---|
| 2011/0141300 A1* | 6/2011 | Stec | ..................... H04N 23/698 |
| | | | 348/222.1 |
| 2021/0392241 A1* | 12/2021 | Ilic | ...................... H04N 23/632 |

* cited by examiner

Cylinder
210

Cut
220

Developed,
flat
230

200

260

240

250

400
410
420
430
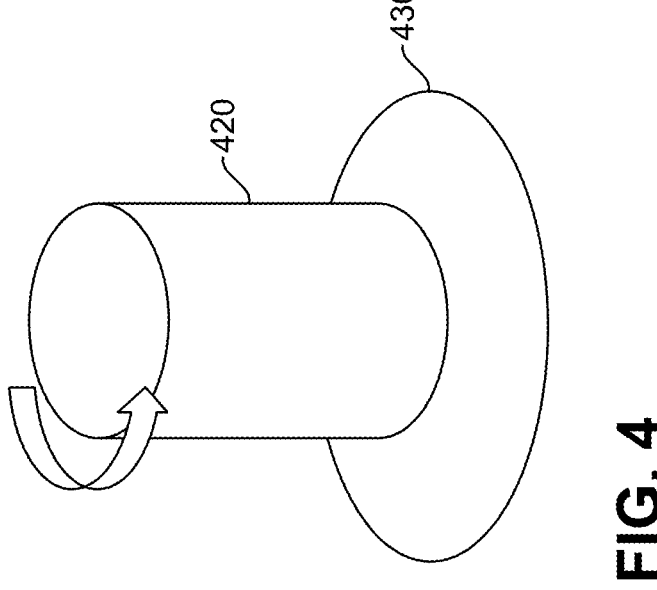
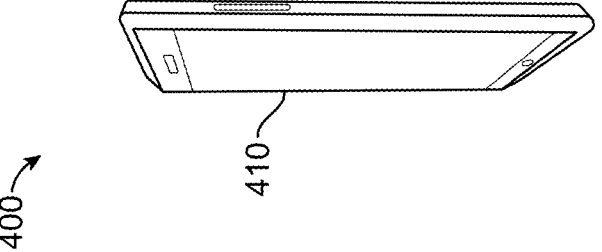
FIG. 4

810

820

810

800

1200

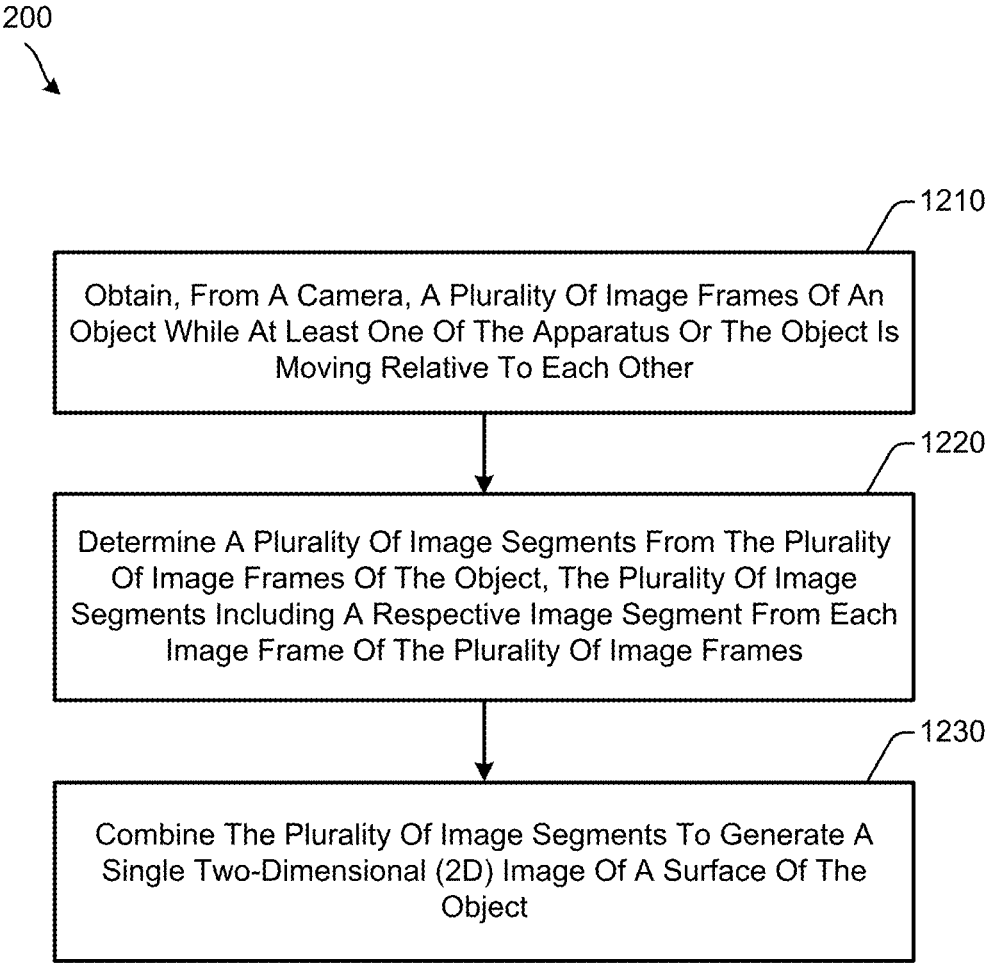

1210

Obtain, From A Camera, A Plurality Of Image Frames Of An Object While At Least One Of The Apparatus Or The Object Is Moving Relative To Each Other

1220

Determine A Plurality Of Image Segments From The Plurality Of Image Frames Of The Object, The Plurality Of Image Segments Including A Respective Image Segment From Each Image Frame Of The Plurality Of Image Frames

1230

Combine The Plurality Of Image Segments To Generate A Single Two-Dimensional (2D) Image Of A Surface Of The Object

FIG. 12

ROLLOUT PHOTOGRAPHY SYSTEMS AND METHODS FOR MOBILE DEVICES

FIELD

This application is related to image processing. In some examples, aspects of this application relate to systems and techniques for providing rollout photography for mobile devices.

BACKGROUND

The increasing versatility of digital camera products has allowed digital cameras to be integrated into a wide array of devices (e.g., mobile devices) and has expanded their use to different applications. For example, mobile devices, such as mobile phones, smart phones, tablet computers, wearable devices, drones, vehicles, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

Electronic devices, such as mobile electronic devices, are increasingly equipped with camera hardware to capture image frames, such as still images and/or video frames, of a scene. A camera is a device that receives light and captures image frames (e.g., still images or video frames) using an image sensor. In some examples, a camera may include one or more processors, such as image signal processors (ISPs), that can process one or more image frames captured by an image sensor. For example, a raw image frame captured by an image sensor can be processed by an image signal processor (ISP) of a camera to generate a preview of the image prior to the final display of the image.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for providing rollout photography for mobile devices. According to at least one illustrative example, an apparatus for performing rollout photography is provided. The apparatus includes at least one memory and at least one processor coupled to the at least one memory and configured to: obtain, from a camera, a plurality of image frames of an object while at least one of the apparatus or the object is moving relative to each other; determine a plurality of image segments from the plurality of image frames of the object, the plurality of image segments including a respective image segment from each image frame of the plurality of image frames; and combine the plurality of image segments to generate a single two-dimensional (2D) image of a surface of the object.

In another illustrative example, a method for rollout photography is provided. The method includes: obtaining, by a camera of a mobile device, a plurality of image frames of an object while at least one of the mobile device or the object is moving relative to each other; determining, by one or more processors of the mobile device, a plurality of image segments from the plurality of image frames of the object, the plurality of image segments including a respective image segment from each image frame of the plurality of image frames; and combining, by the one or more processors of the mobile device, the plurality of image segments to generate a single two-dimensional (2D) image of a surface of the object.

In another illustrative example, a non-transitory computer-readable storage medium is provided that includes instructions stored thereon which, when executed by at least one processor, causes the at least one processor to: obtain, from a camera, a plurality of image frames of an object while at least one of the apparatus or the object is moving relative to each other; determine a plurality of image segments from the plurality of image frames of the object, the plurality of image segments including a respective image segment from each image frame of the plurality of image frames; and combine the plurality of image segments to generate a single two-dimensional (2D) image of a surface of the object.

In another illustrative example, an apparatus for performing rollout photography is provided. The apparatus includes means for obtaining, from a camera, a plurality of image frames of an object while at least one of the apparatus or the object is moving relative to each other; means for determining a plurality of image segments from the plurality of image frames of the object, the plurality of image segments including a respective image segment from each image frame of the plurality of image frames; and means for combining the plurality of image segments to generate a single two-dimensional (2D) image of a surface of the object.

In some aspects, one or more of the apparatuses described herein is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a mobile device (e.g., a mobile telephone or so-called "smart phone," a wearable device, a tablet computer, a mobile robotics device, a drone, a vehicle, or other device). In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 4 is a diagram illustrating an example of a capture mode for rollout photography using a mobile device, where the mobile device is held steady and the object is rotated in place, in accordance with some examples.

FIG. 12 is a flow diagram illustrating an example of a process for rollout photography for mobile devices, in accordance with some examples.

DETAILED DESCRIPTION

Figure 1:
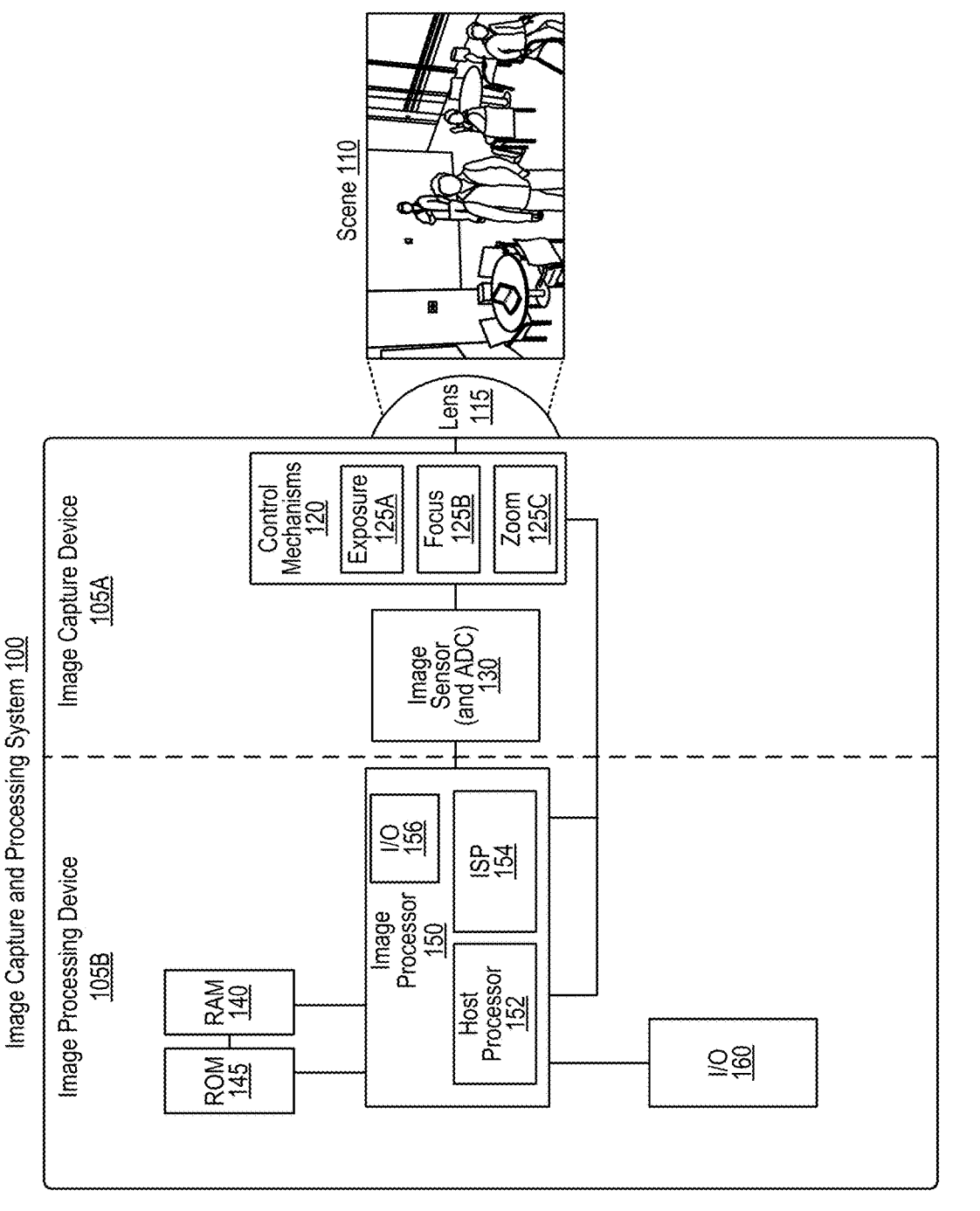
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Electronic devices are increasingly equipped with camera hardware to capture image frames, such as still images and/or video frames, of a scene. As used herein, the terms "image," "frame," and "image frame" are used interchangeably. A camera is a device that receives light and captures image frames, in the form of still images or video frames, using an image sensor. In one or more examples, a camera may include one or more processors, such as ISPs, that can process one or more image frames captured by an image sensor. For example, a raw image frame captured by an image sensor can be processed by an ISP of a camera to generate a preview of the image prior to the final display of the image.

As previously mentioned, the increasing versatility of digital camera products has allowed digital cameras to be integrated into a wide array of devices (e.g., mobile devices) and has expanded their use to different applications. For example, mobile devices, such as mobile phones, smart phones, tablet computers, wearable devices, drones, vehicles, and many other devices today are often equipped with camera devices. The camera devices allow users to capture images and/or video (e.g., including frames of images, referred to as image frames) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

Rollout photography is utilized to create a two-dimensional (2D) photographic image of a three-dimensional (3D) object. Rollout photography is a type of peripheral photography, and is essentially a photographic equivalent of cylindrical map projection in cartography. Rollout photography is often used for capturing images of cylindrical-shaped objects, such as cylinders, vases, pottery, sculptures, and trophies. Rollout photography is able to provide a planar representation of characteristics (e.g., illustrations or textures) on an external surface of an object. Photographic images techniques are used to capture the planar representation.

Rollout photography typically employs the use of strip photography, where a camera with a vertical slit aperture is positioned opposite a turntable (e.g., a rotating tray, such as a lazy susan) on which an object is placed and centered. Both the camera and the object are orientated together as accurately as possible to minimize any aberrations due to the camera's focusing mechanism, the vertical slit aperture, and characteristics of the object. As such, rollout photography requires a complicated setup for the camera and for rotating the object, and requires complex processing.

During the process of rollout photography, the turntable is rotated such that the object is rotated. During the rotation of the object, film in the camera is exposed through the slit of the aperture in short time intervals, which correspond to the dimensions of the aperture, to capture strips of images of the object. The strips of images are constructed together through processing to form a single, fluid 2D image of the surface of the object.

Currently, many mobile devices (e.g., smart phones, tablet computers, wearable devices, drones, and/or vehicles) include camera devices. These camera devices do not include vertical slit apertures for performing rollout photography and, currently, there is not an effective way for mobile devices to photograph cylindrical objects. Rollout photography can be a desirable feature in mobile devices for capturing details of external surfaces of cylindrical-shaped objects in a single 2D image. As such, a solution for mobile devices to perform rollout photography can be beneficial.

Accordingly, systems, apparatuses, processes (also referred to as methods), and computer-readable media (collectively referred to herein as "systems and techniques") are described herein for providing rollout photography for mobile devices. For the systems and techniques, the camera in the mobile device can obtain image segments (e.g., also referred to as segments or strips of images) of an object by selecting subsections of image frames of an object (e.g., which has the same effect as using a slit aperture).

Figure 5:
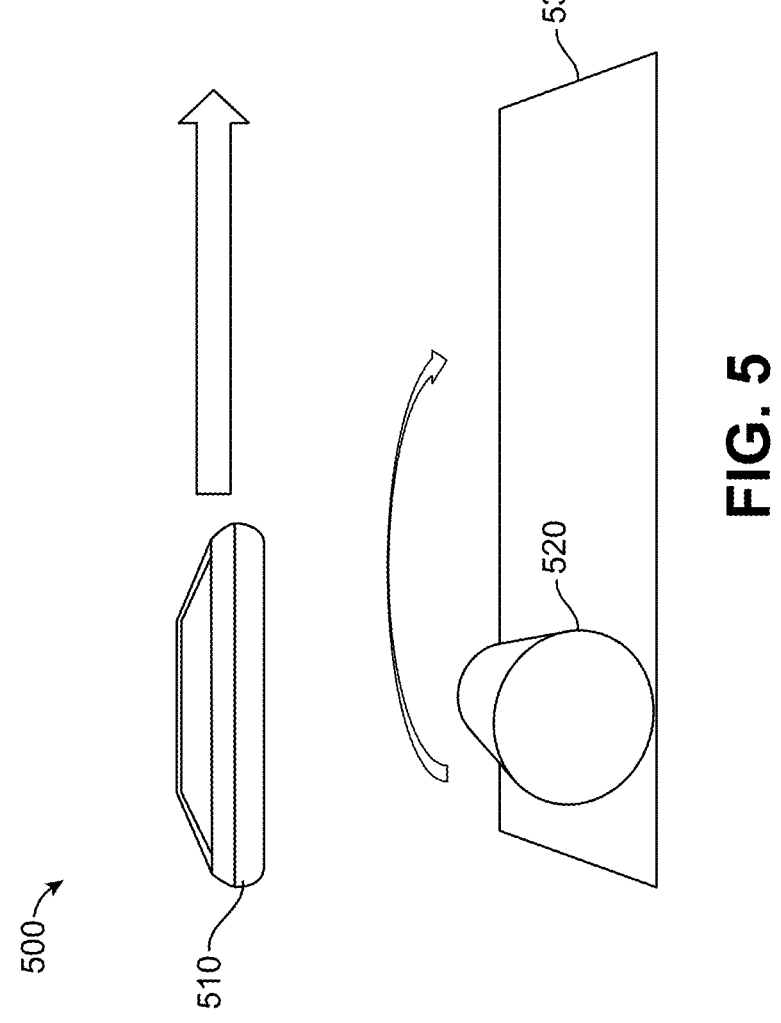
FIG. 5 is a diagram illustrating an example of a capture mode for rollout photography using a mobile device, where the object is rolled and the mobile device is translated, in accordance with some examples.
Figure 6:
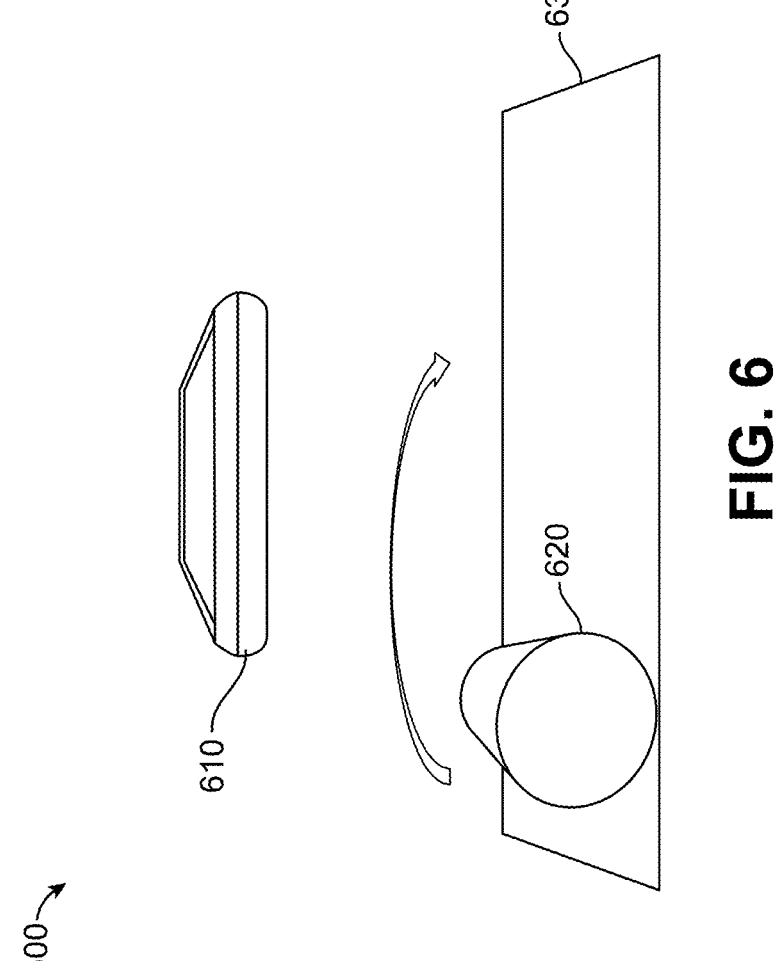
FIG. 6 is a diagram illustrating an example of a capture mode for rollout photography using a mobile device, where the object is rolled and the mobile device is held steady, in accordance with some examples.
Figure 7:
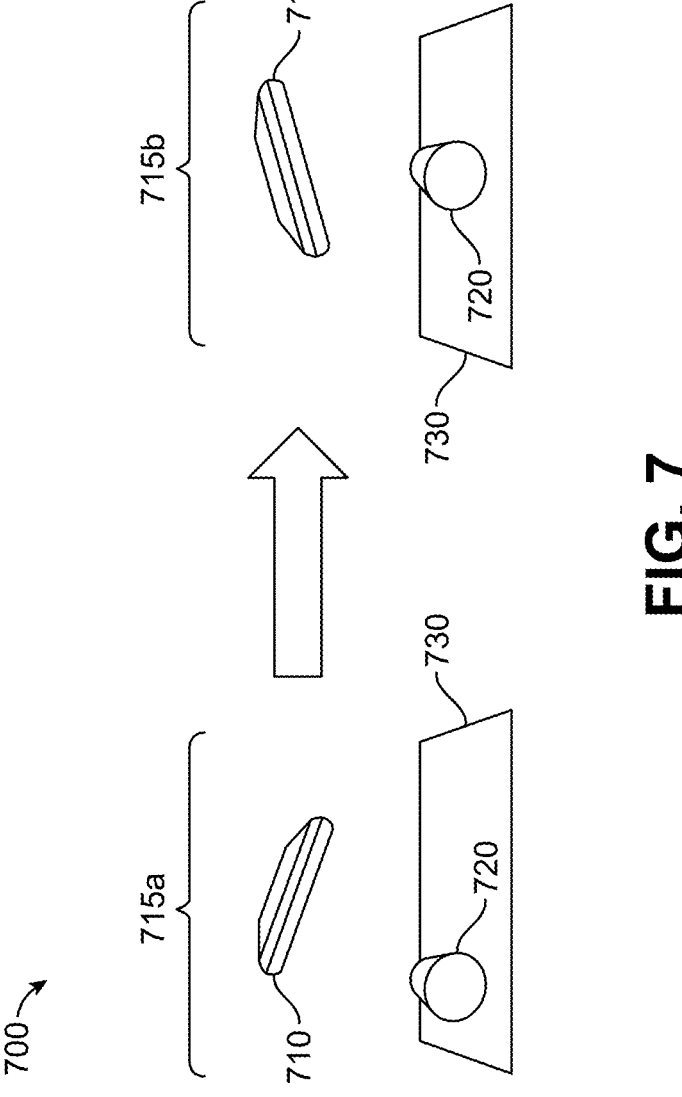
FIG. 7 is a diagram illustrating an example of a capture mode for rollout photography using a mobile device, where the object is rolled and the mobile device is rotated, in accordance with some examples.
Figure 8:
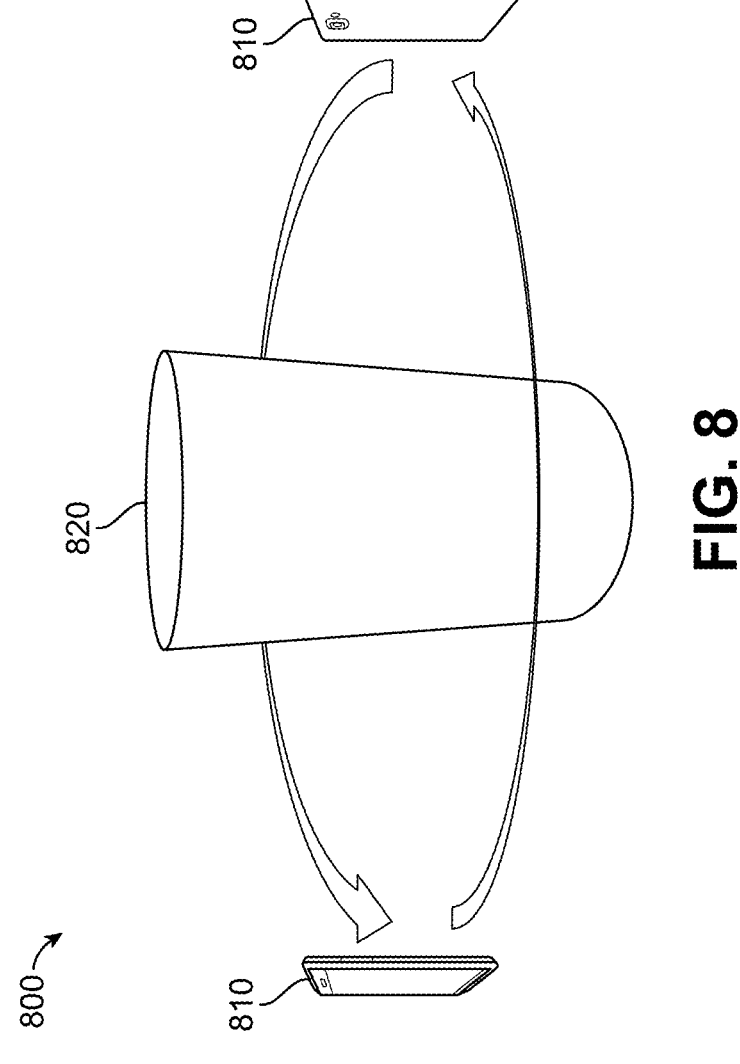
FIG. 8 is a diagram illustrating an example of a capture mode for rollout photography using a mobile device, where the mobile device is revolved around the object, in accordance with some examples.

In one or more aspects, the systems and techniques provide multiple capture modes for mobile devices to perform rollout photography. These capture modes involve capturing image frames of a cylindrical-shaped object by: holding the mobile device (e.g., the camera) steady and rotating the object in place as shown in FIG. 4, rolling the object and translating the mobile device (e.g., the camera) as shown in FIG. 5, rolling the object while keeping the mobile device (e.g., the camera) steady as shown in FIG. 6, rotating the mobile device (e.g., the camera) while rolling the object as shown in FIG. 7, and revolving the mobile device (e.g., the camera) around the object as shown in FIG. 8.

In one or more aspects, for each of these different capture modes, the entire periphery of the object need not always be captured, and the stitching of the obtained image segments along an arc may be sufficient to capture the desired portion of the external surface of the object. In some aspects, the curvature of the object of interest can be analyzed. Based on the curvature of the object, a sampling rate for obtaining the image frames can be determined. In one or more aspects, the mobile device may display an on-screen user interface (UI) to guide the user to facilitate the capture mode of choice (e.g., to guide the user to move the mobile phone and/or object appropriately for capturing the image frames).

Further aspects of the systems and techniques are described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1510 discussed with respect to the computing system 1500. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface), an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1525, read-only memory (ROM) 145/1520, a cache 1512, a memory unit 1515, another storage device 1530, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames.

In some examples, the host processor 152 can perform electronic image stabilization (EIS). For instance, the host processor 152 can determine a motion vector corresponding to motion compensation for one or more image frames. In some aspects, host processor 152 can position a cropped pixel array ("the image window") within the total array of pixels. The image window can include the pixels that are used to capture images. In some examples, the image window can include all of the pixels in the sensor, except for a portion of the rows and columns at the periphery of the sensor. In some cases, the image window can be in the center of the sensor while the image capture device 105A is stationary. In some aspects, the peripheral pixels can surround the pixels of the image window and form a set of buffer pixel rows and buffer pixel columns around the image window. Host processor 152 can implement EIS and shift the image window from frame to frame of video, so that the image window tracks the same scene over successive frames (e.g., assuming that the subject does not move). In some examples in which the subject moves, host processor 152 can determine that the scene has changed.

In some examples, the image window can include at least 95% (e.g., 95% to 99%) of the pixels on the sensor. The first region of interest (ROI) (e.g., used for AE and/or AWB) may include the image data within the field of view of at least 95% (e.g., 95% to 99%) of the plurality of imaging pixels in the image sensor 130 of the image capture device 105A. In some aspects, a number of buffer pixels at the periphery of the sensor (outside of the image window) can be reserved as a buffer to allow the image window to shift to compensate for jitter. In some cases, the image window can be moved so that the subject remains at the same location within the adjusted image window, even though light from the subject may impinge on a different region of the sensor. In another example, the buffer pixels can include the ten topmost rows, ten bottommost rows, ten leftmost columns and ten right-most columns of pixels on the sensor. In some configurations, the buffer pixels are not used for AF, AE or AWB when the image capture device 105A is stationary and the buffer pixels not included in the image output. If jitter moves the sensor to the left by twice the width of a column of pixels between frames, the EIS algorithm can be used to shift the image window to the right by two columns of pixels, so the captured image shows the same scene in the next frame as in the current frame. Host processor 152 can use EIS to smoothen the transition from one frame to the next.

In some aspects, the host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, de-mosaicing, color conversion, correction or enhancement/suppression of image attributes, denoising filters, sharpening filters, among others. The settings of different modules of the ISP 154 can be configured by the host processor 152. Each module may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image capture and processing system 100 may perform one or more of the image processing functionalities described above automatically. For instance, one or more of the control mechanisms 120 may be configured to perform auto-focus operations, auto-exposure operations, and/or auto-white-balance operations. In some embodiments, an auto-focus functionality allows the image capture device 105A to focus automatically prior to capturing the desired image. Various auto-focus technologies exist. For instance, active autofocus technologies determine a range between a camera and a subject of the image via a range sensor of the camera, typically by emitting infrared lasers or ultrasound signals and receiving reflections of those signals. In addition, passive auto-focus technologies use a camera's own image sensor to focus the camera, and thus do not require additional sensors to be integrated into the camera. Passive AF techniques include Contrast Detection Auto Focus (CDAF), Phase Detection Auto Focus (PDAF), and in some cases hybrid systems that use both. The image capture and processing system 100 may be equipped with these or any additional type of auto-focus technology.

As previously mentioned, rollout photography can be utilized to create a 2D photographic image of a 3D object. Rollout photography is a type of peripheral photography, and is essentially a photographic equivalent of cylindrical map projection in cartography. Rollout photography is typically used for capturing images of cylindrical-shaped objects (e.g., cylinders, vases, pottery, sculptures, and trophies). Rollout photography can provide a planar representation of characteristics, such as illustrations or textures, on an external surface of an object. Photographic images techniques can be used to capture the planar representation.

Rollout photography performs strip photography. For strip photography, a camera with a vertical slit aperture is positioned opposite a turntable (e.g., a rotating tray, such as a lazy susan) on which an object is placed and centered. The camera and the object are orientated together as precisely as possible to minimize any aberrations (e.g., which can be due to the camera's focusing mechanism, the vertical slit aperture, and characteristics of the object). Rollout photography requires a complicated camera setup and setup for rotating the object, and requires complex processing.

During the process of rollout photography, the turntable is rotated such that the object is rotated. During the rotation of the object, film in the camera is exposed through the aperture slit in short time intervals (e.g., which correspond to the dimensions of the aperture) to capture strips of images of the object. The strips of images are constructed together through processing to form a single, fluid 2D image of the surface of the object.

Figure 2:
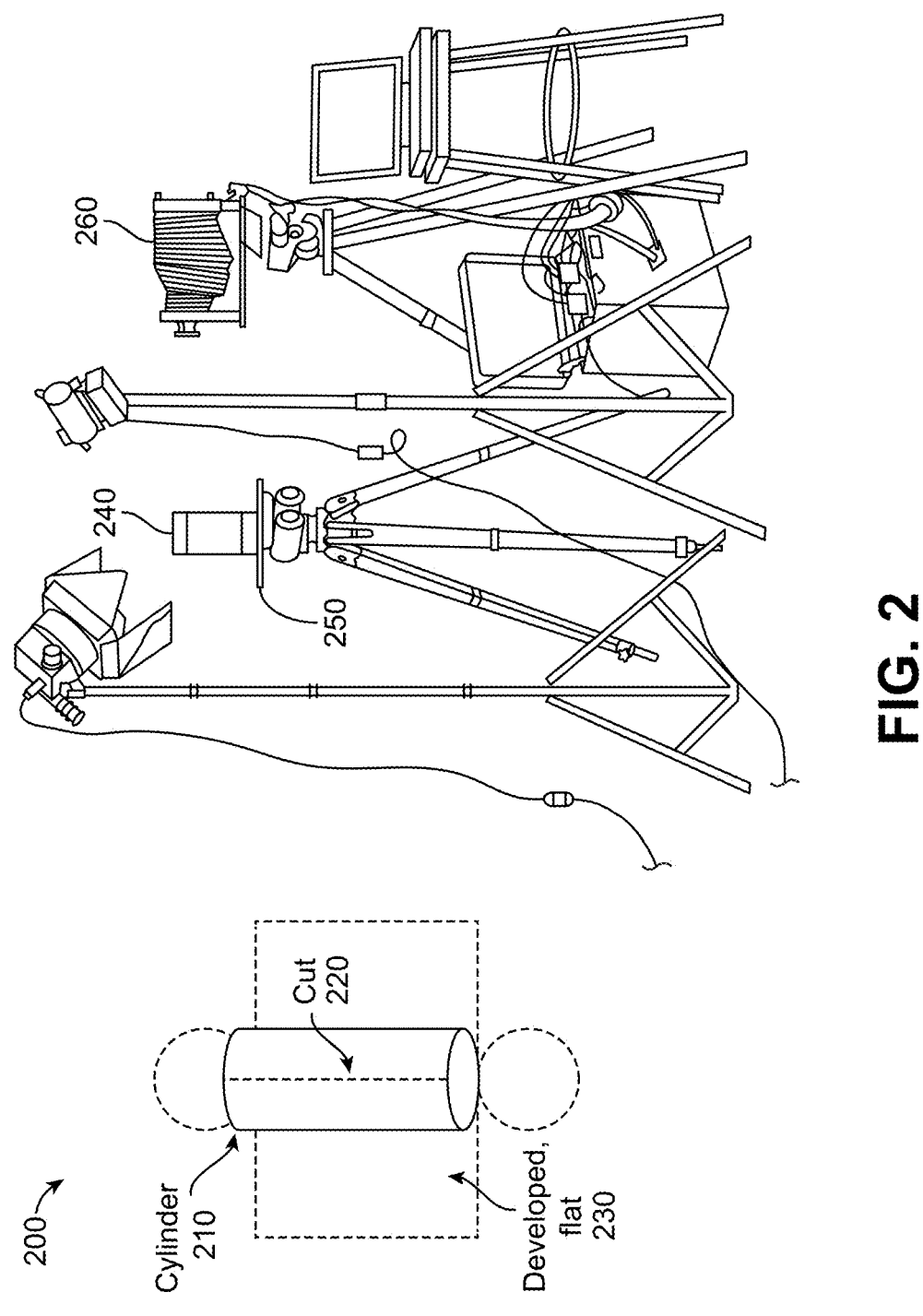
FIG. 2 is a diagram illustrating an example of a camera system for performing rollout photography of a cylindrical object, in accordance with some examples.

FIG. 2 shows an example of rollout photography using strip photography. In particular, FIG. 2 is a diagram illustrating an example of a camera system 200 for performing rollout photography of a cylindrical object. FIG. 2 shows an example of a complicated camera setup, which is needed for rollout photography. In FIG. 2, an object 240 in the shape of a cylinder is shown. The object 240 is shown to be placed onto a rotatable turntable 250. FIG. 2 also shows a camera 260 that has a vertical slit aperture for performing rollout photography. During operation for rollout photography, the turntable 250 is rotated to rotate the object 240. While the object 240 is rotating, the camera 260 is capturing slit images, through the vertical slit aperture, of the surface of the object 240. The captured slit images are combined together to form a 2D image of the surface of the object 240.

FIG. 2 also shows an object 210 in the form of a cylinder. The cut 220 shown on the object 210 represents the portion of the object 210 that a slit image is captured. After multiple slit images of the object 210 are obtained, the slit images are constructed together to form a single 2D image, which is developed into a flat photo 230.

Figure 3:
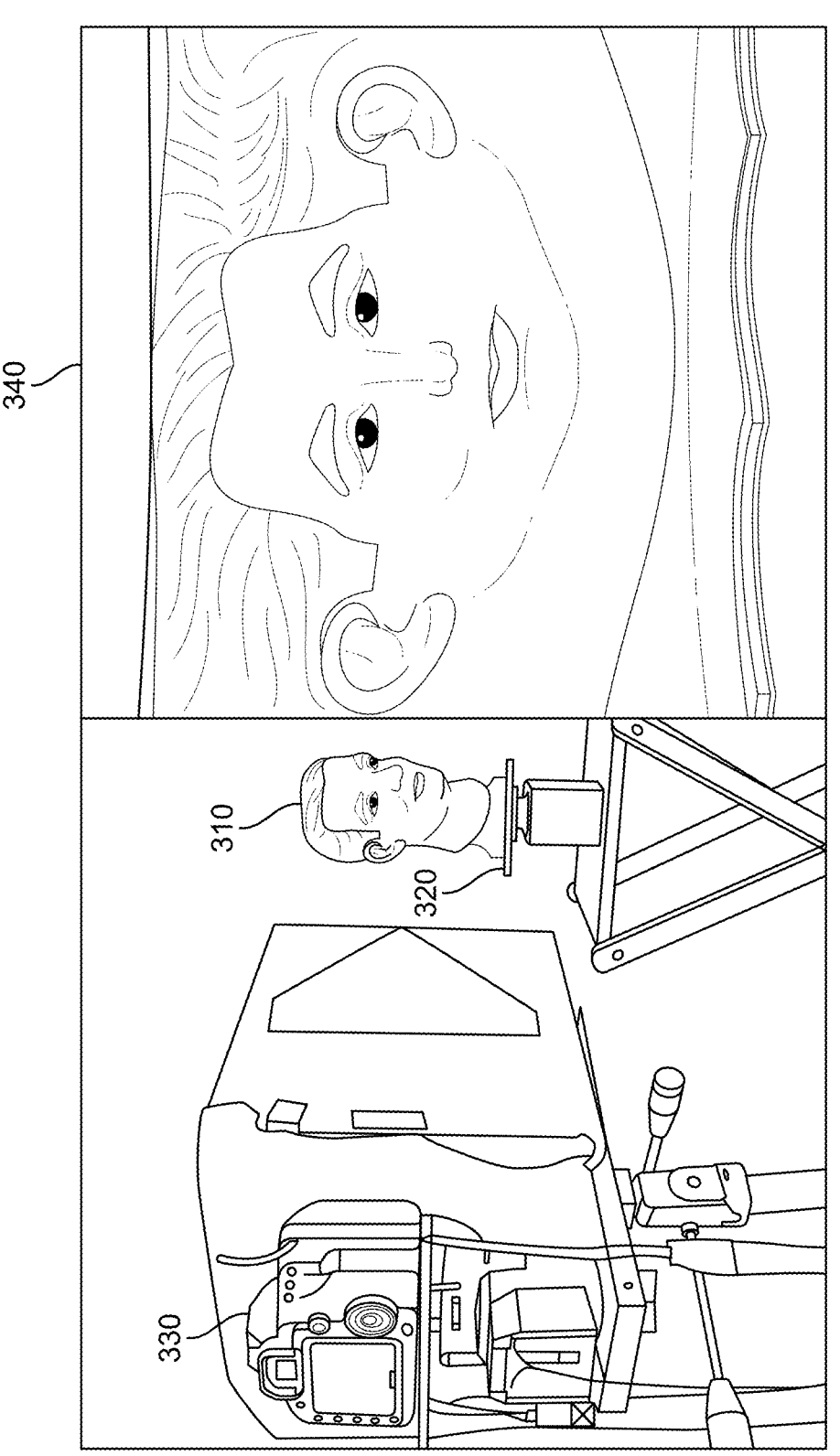
FIG. 3 is a diagram illustrating an example of an image of a sculpture obtained from rollout photography, in accordance with some examples.

FIG. 3 shows an example of rollout photography being performed on a sculpture (e.g., cylindrical-shaped object). In particular, in FIG. 3 is a diagram illustrating an example of an image 340 of a sculpture 310 (e.g., a bust of a head) obtained from rollout photography. In FIG. 3, the sculpture 310 is shown to be placed onto a rotatable turntable 320. FIG. 3 shows a camera 330 that has a vertical slit aperture for performing rollout photography.

During operation for rollout photography, the turntable 320 is rotated to rotate the sculpture 310. While the sculpture 310 is rotating, the camera 330 is capturing slit images, through the vertical slit aperture, of the surface of the sculpture 310. The captured slit images are combined together to form a 2D image 340 of the surface of the sculpture 310.

Currently, many mobile devices (e.g., smart phones, tablet computers, wearable devices, drones, and/or vehicles) include camera devices. These camera devices do not include vertical slit apertures for performing rollout photography. There is currently not an effective way for mobile devices to photograph cylindrical objects. Rollout photography can be a desirable feature in mobile devices for capturing details of external surfaces of cylindrical-shaped objects in a single 2D image. As such, a solution for mobile devices to perform rollout photography can be useful.

Mobile devices, such as smart phones, already have infrastructure for panoramic photography. Panoramic photography is similar to rollout photography in that it involves stitching together a series of images to form a single image, and applying geometric (e.g., warping), illumination, and chromaticity corrections to the formed image. Mobile devices also have a fusion with their camera infrastructure and their inertial measurement units (IMUs). However, these existing panoramic photography features in mobile devices alone do not allow for the mobile devices to be able to immediately perform rollout photography. For example, changes in visible features of a small object of interest within a large field of view (FOV) may not register as substantial scene changes to trigger the capture of new images (e.g., image segments). For another example, camera displacement, which is small in the context of panoramic photography, can be very large for rollout photography of a small object. Both of these examples can lead to loss in details of the object.

In one or more aspects, the systems and techniques provide solutions for rollout photography for mobile devices. For the systems and techniques, the camera in the mobile device can obtain image segments (e.g., similar to strips of images) of an object by selecting subsections of image frames of an object (e.g., which has the same effect as using a slit aperture).

In one or more aspects, the systems and techniques provide multiple capture modes for mobile devices to perform rollout photography. These capture modes involve capturing image frames of a cylindrical-shaped object by: holding the mobile device (e.g., the camera) steady and rotating the object in place as shown in FIG. 4, rolling the object and translating the mobile device (e.g., the camera) as shown in FIG. 5, rolling the object while keeping the mobile device (e.g., the camera) steady as shown in FIG. 6, rotating the mobile device (e.g., the camera) while rolling the object as shown in FIG. 7, and revolving the mobile device (e.g., the camera) around the object as shown in FIG. 8.

In one or more aspects, for each of these different capture modes, the entire periphery of the object need not always be captured, and the stitching of the obtained image segments along an arc may be sufficient to capture the desired portion of the external surface of the object. In some aspects, the curvature of the object of interest can be analyzed. Based on the curvature of the object, a sampling rate for obtaining the image frames can be determined. In one or more aspects, the mobile device may display an on-screen user interface (UI) to guide the user to facilitate the capture mode of choice (e.g., to guide the user to move the mobile phone and/or object appropriately for capturing the image frames).

In one or more aspects, the systems and techniques for rollout photography using mobile devices can employ artificial intelligence (AI) for object detection, image segmentation, geometric and kinematic estimation, and depth estimation and/or sensing (e.g., image based, sensor fusion, etc.).

In one or more aspects, the systems and techniques for rollout photography using mobile devices can provide a user interface/experience (UI/X) for the user. In one or more examples, a user interface can be employed that can provide guiding instructions (guidance) to the user for the capturing of the image frames (e.g., a capture interface). In some examples, the user interface can allow for the user to select a capture procedure (e.g., from one of the capture procedures shown in FIGS. 8 through 12) to use for performing the rollout photography. In one or more examples, the user interface can determine the capture procedure (e.g., from one of the capture procedures shown in FIGS. 8 through 12) based on sensor input (e.g., sensor data, such as image data and/or IMU data). In some examples, the user interface can provide a post-capture visualization interface to enable 3D manipulation of the generated image by the user, and to provide a viewing of the rollout 2D image(s) to the user.

As previously mentioned, various different capture modes (or capture procedures) can be employed for the disclosed rollout photography for mobile devices. In one or more examples, for performance of the rollout photography using a mobile device, a specific capture mode to be used for the rollout photography can be established (e.g., by being previously preset, being user selectable, such as within a user interface, or by being automatically determined by the mobile device itself). After the capture mode is established, a series of image frames of the object can be captured using the established capture mode. Image subsections of the captured image frames can then be selected (e.g., by being previously preset, being user selectable, such as within a user interface, or by being automatically determined by the mobile device itself). The image subsections can then be optionally enhanced (e.g., warping corrections, illumination compensations, chromaticity/color corrections, any combination thereof, and/or using other enhancement techniques). The image subsections can be stitched together to generate the single 2D image of the object. Further processing of the 2D image (e.g., translating of text on the image) can optionally be performed.

FIGS. 4-8 each show an example of a capture mode (or capture procedure) that can be employed for the disclosed rollout photography for mobile devices. In particular, FIG. 4 is a diagram illustrating an example of a capture mode 400 for rollout photography using a mobile device 410, where the mobile device 410 (e.g., camera) is held steady and the object 420 is rotated in place. In FIG. 4, the object 420 is centered and placed on a turntable 430. During the performance of rollout photography using this capture mode 400, a camera can obtain image frames of the object 420, while a user holds the mobile device 410 (e.g., the camera) steady in one location and the object 420 is rotated via the turntable 430. This capture mode 400 is particularly useful for irregular objects (e.g., not perfectly cylindrical objects, such as sculptures, trophies, oval prisms, frustums, or objects having a rounded or cylindrical cross section for a subsection of the object height). A turntable is just one illustrative example of a case where a mobile device (e.g., mobile device 410) is maintained in a steady or static state while an object (e.g., object 420) is rotated in place. In general, any method of manipulating the object can be performed. For instance, while the mobile device 410 is maintained in a steady or static state, the object 420 can be manipulated by the user in a continuous manner or through a plurality of discrete steps to effectively rotate the object (e.g., the user can introduce rotational position changes on the object by moving the object from the top or the bottom/base of the object).

FIG. 5 is a diagram illustrating an example of a capture mode 500 for rollout photography using a mobile device 510, where the object 520 is rolled and the mobile device 510 (e.g., camera) is translated. In FIG. 5, the object 520 placed on a flat, planar surface 530. During the performance of rollout photography using this capture mode 500, a camera can obtain image frames of the object 520, while the object 520 is rolled across the length of the surface 530 and a user translates (moves) the mobile device (e.g., the camera) across the length of the surface 530.

FIG. 6 is a diagram illustrating an example of a capture mode 600 for rollout photography using a mobile device 610, where the object 620 is rolled and the mobile device 610 is held steady. In FIG. 6, the object 620 placed on a flat, planar surface 630. During the performance of rollout photography using this capture mode 600, a camera can obtain image frames of the object 620, while the object 620 is rolled across the length of the surface 630 and a user holds the mobile device 610 (e.g., the camera) steady in place in one position above the surface 630. 2D images generated using capture mode 600 can require greater counter-distortion adjustments than 2D images generated using capture modes 400, 500. The primary difference between capture mode 400 of FIG. 4 and capture mode 600 of FIG. 6 is that for capture mode 400, the location of the object 420 within the FOV of the camera is substantially constant.

FIG. 7 is a diagram illustrating an example of a capture mode 700 for rollout photography using a mobile device 710, where the object 720 is rolled and the mobile device 710 is rotated. In FIG. 7, the object 720 placed on a flat, planar surface 730. During the performance of rollout photography using this capture mode 700, a camera can obtain image frames of the object 720, while a user holds the mobile device 710 in one location and rotates the mobile device 710 (e.g., the camera) during the rolling of the object 720 across the surface 730, such that the camera of the mobile device 710 is always substantially directed towards the object 720. In FIG. 7, a configuration 715*a* of the mobile device 710 in relation to the object 720 is shown for a first time (t1), and a configuration 715*b* of the mobile device 710 in relation to the object 720 is shown for a second time (t2), which occurs a duration of time after the first time.

FIG. 8 is a diagram illustrating an example of a capture mode 800 for rollout photography using a mobile device 810, where the mobile device 810 is revolved around the object 820. In FIG. 8, the object 820 is placed on a flat surface. During the performance of rollout photography using this capture mode 800, a camera can obtain image frames of the object 820, while a user revolves (e.g., moves) the mobile device 810 (e.g., the camera) around the perimeter of the object 820.

In one or more aspects, for all of these capture modes 400, 500, 600, 700, and 800, the rollout photography process does not require capturing image frames of the entirety of the object (e.g., of the entire perimeter of the object). Stitching image segments (from the image frames) along any arc can be sufficient. However, capturing the same portion of an object twice can be useful to indicate that image frames have been captured a full revolution around the object, which can be used to automatically indicate completion of the rollout photograph (e.g., the generated 2D image).

Figure 9:
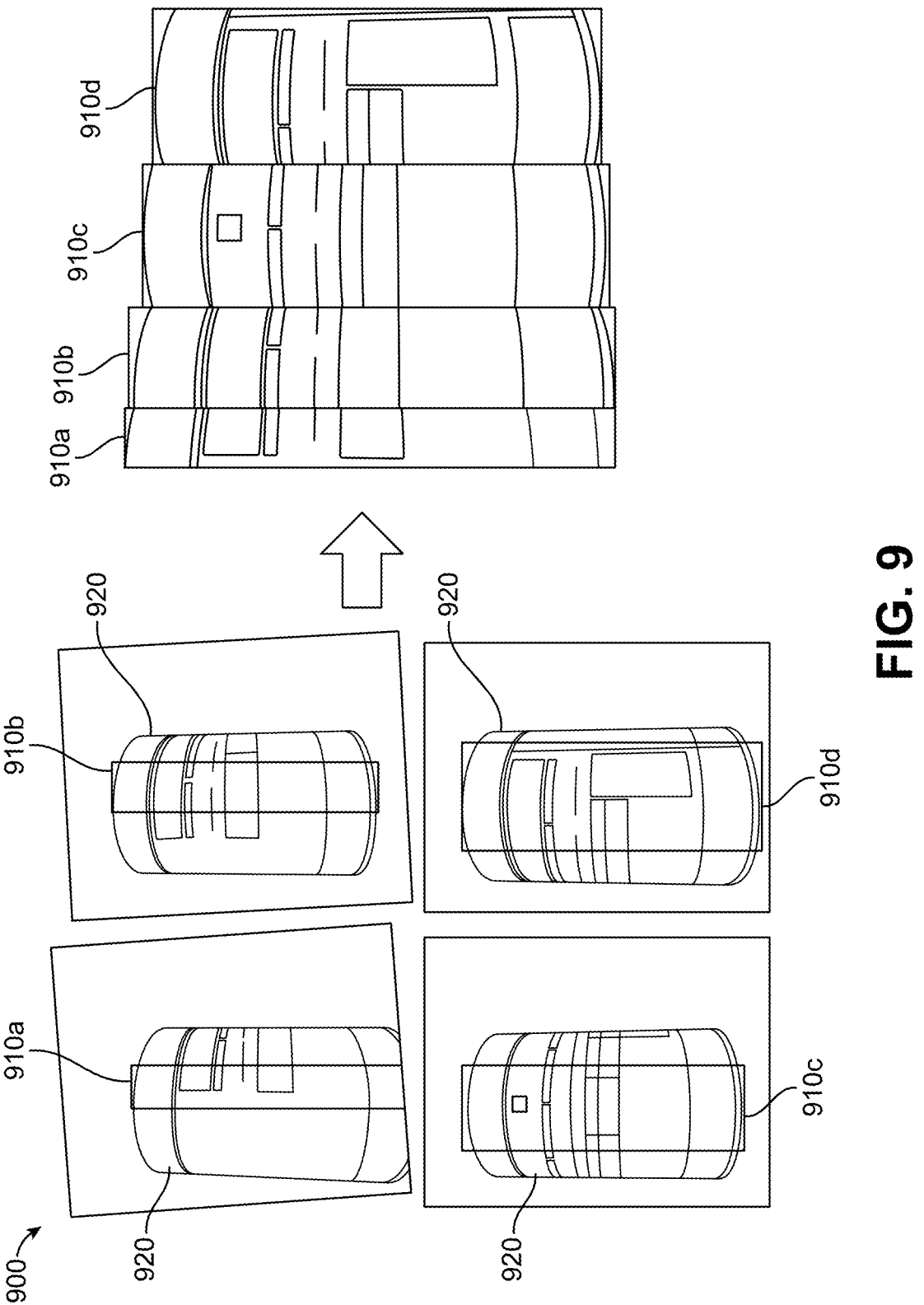
FIG. 9 is a diagram illustrating an example of rollout photography using a mobile device, where image segments associated with an object are stitched together to form an image of the object, in accordance with some examples.

FIG. 9 shows an example of stitching image segments obtained from captured image frames of an object using rollout photography for mobile devices. In particular, FIG. 9 is a diagram illustrating an example of rollout photography 900 using a mobile device, where image segments 910*a*, 910*b*, 910*c*, 910*d* associated with an object 920 are stitched together to form an image of the object 920. In FIG. 9, four captured image frames of an object 920 (e.g., a coffee can) are shown. In one or more examples, a user may desire to read the text (e.g., instructions and/or ingredients) on the back side of the object 920 (e.g., a coffee can). Subsections of the image frames can be selected (e.g., to capture the text on the back side of the coffee can) to obtain the image segments 910*a*, 910*b*, 910*c*, 910*d*. The image segments 910*a*, 910*b*, 910*c*, 910*d* can be stitched together to form a single 2D image. In FIG. 9, the formed 2D image is shown to require postprocessing (e.g., for applying geometric warping, illumination, and/or chromaticity corrections) in order to obtain a single, fluid 2D image of the object 920 (e.g., of the text on the object 920).

Figure 10:
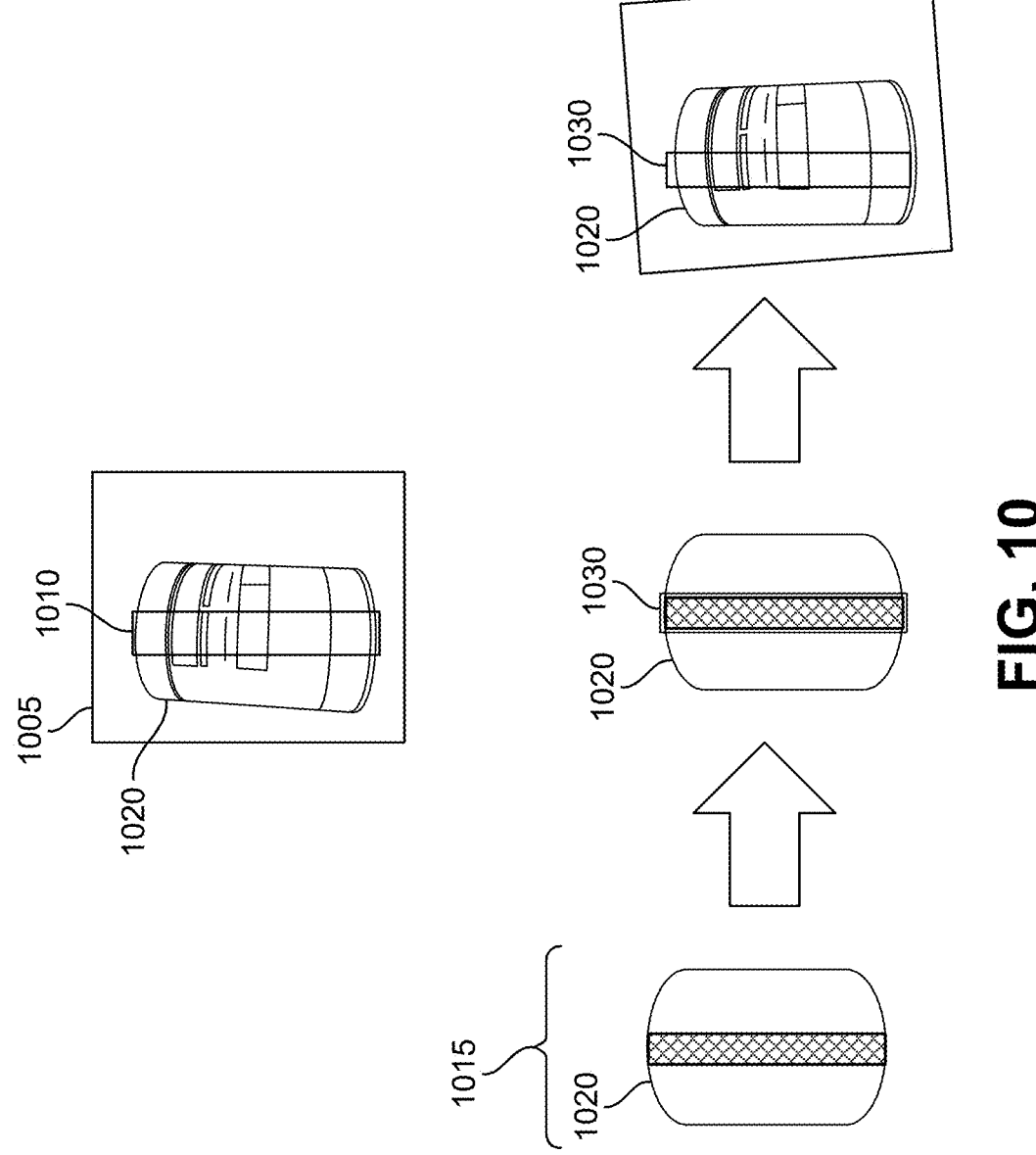
FIG. 10 is a diagram illustrating examples of methods for determining subsections of image frames of an object for obtaining image segments for rollout photography for mobile devices, in accordance with some examples.

FIG. 10 shows examples of methods for determining subsections of image frames of an object for obtaining image segments for rollout photography for mobile devices, in accordance with some examples. In particular, FIG. 10 shows an example of a user interface for a user to select a subsection of an image frame of an object 1020. In FIG. 10, the user interface can display a subsection guide 1010 in an image 1005. The subsection guide 1010 is adjustable by the user via the user interface. For example, the user can provide user input via the user interface to change the dimensions (e.g., the width and/or height, the size, the shape, etc.) and/or location of the subsection of the captured image frame of the object 1020. The user input can include a touch input, gesture input, or other input relative to the subsection guide 1010 to change the dimensions and/or location of the subsection (e.g., a "pinch" of two fingers to make the subsection smaller, a "pull" of two fingers away from one another to make the subsection larger, a "drag" of one or more fingers to move a location of the subsection, etc.).

FIG. 10 also shows an example of a subsection being automatically determined based on a depth estimation map. In FIG. 10, a depth estimation map 1015 of the object 1020 in the image 1005 is shown. In some cases, the depth estimation map 1015 may be determined by performing depth estimation (e.g., using a depth estimation neural network, such as a convolutional neural network (CNN), or using another depth estimation method). The depth estimation map 1015 may include a depth value for each pixel of the image 1005. Based on the depth estimation map 1015, characteristics (e.g., a shape such as a rectangular shape or otherwise contiguous shape, dimensions, and/or location) for a subsection 1030 of the image frame can be automatically determined. For example, a shape, dimension, and location of the subsection 1030 can be determined to include points (e.g., pixels) of the object in the image having a depth or distance in the depth estimation map 1015 that is less than a particular distance threshold value (e.g., 12 inches, 24 inches, or other distance threshold value) or that is closest to a camera used to capture the image 1005. An image segment can then be obtained from the subsection 1030 of the image frame of the object 1020.

In one or more aspects, the systems and techniques can employ integrated image flattening and/or warping techniques for the stitched 2D image to obtain a more fluid, 2D image. In some aspects, for images with text, systems and techniques can integrate text-stitching techniques. In some aspects, for relatively large objects, whose projections are larger than the image frame, the stitching would be of the entire image.

In one or more aspects, the systems and techniques can generate the background of the stitched 2D image such that the background is filled with a solid color (e.g., black or white), the background is transparent, the background contains a segment of the background from an input series of captured image frames (e.g., inpainting for consistency with the original background; processed, such as for motion blur).

In one or more aspects, the systems and techniques can employ a user interface in the display of the mobile device to guide the user. In one or more examples, the user interface can provide an on-screen guidance to the user to facilitate the capture operation in a manner appropriate for the selected and/or available rollout photography method (e.g., capture mode). In some examples, the mobile device (e.g., processors of the mobile device) can adjust the guidance of the user interface based on IMU and/or image data. In one or more examples, IMU and/or image data can be used by the mobile device to determine the particular capture method to be used and/or to adjust the image processing accordingly.

Figure 11:
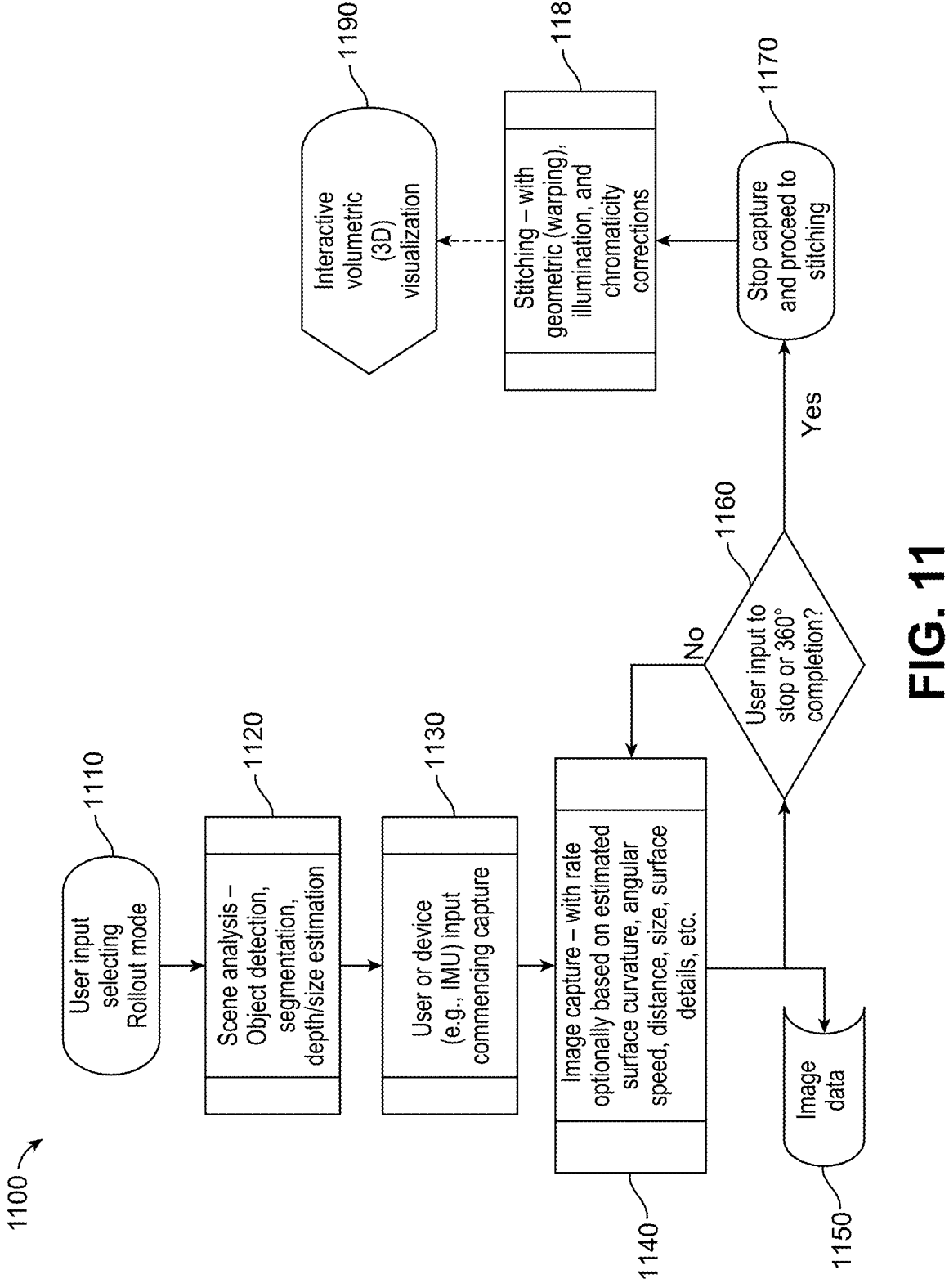
FIG. 11 is a flow diagram illustrating an example of process in a mobile device for performing rollout photography, in accordance with some examples.

FIG. 11 is a flow diagram illustrating an example of process 1100 in a mobile device for performing rollout photography. In FIG. 11, during operation of the process 1100, at block 1110, a user could select the camera application on the mobile device (e.g., smart phone), and then select a rollout photography mode (e.g., via a user interface displayed on a display of the mobile device).

At block 1120, the scene analysis (e.g., to detect the object, perform segmentation, perform depth estimation, and/or perform size estimation, etc.) can be performed automatically or, alternatively, the user can select the capture mode of the user's choice. In one or more examples, the user interface for the rollout photography mode can enable the user select the target object of interest for rollout photography capture. For example, the user can provide user input via the user interface to select the target object. The user input can include a touch input, gesture input, or other input relative to the preview image of the target object displayed through the user interface.

At block 1130, a user (e.g., via the user interface) or a device (e.g., an IMU) can commence capturing image frames of the object. For example, the user interface (UI) can ask the user to confirm the correct object in the view to obtain image frames for the rollout photography. For this example, the user could select the object via the touchscreen. After the object is selected by the user, the object could be highlighted in the display of the user interface. The user can also select the subsections of the object (e.g., via the user interface) for the image segments. In one or more examples, the user can provide user input via a user interface element (e.g., a shutter icon) to commence capturing image frames of the object. In other examples, substantial and coherent motion of the mobile device sensed by the IMU can commence capturing image frames of the object.

At block 1140, the camera of the mobile device can capture the image frames of the object, according to the selected capture mode. The camera can start the capture of image frames automatically, or the user can select a capture button on the user interface, or can start based on motion (of the mobile device and/or the object) detected by the mobile device. The rate of the image capture can be a preset rate, or could be determined dynamically, based on an estimated surface of curvature, angular speed, distance, size, surface details, etc. of the object.

At block 1150, after image frames have been captured by the camera of the mobile device, image data from the image frames can be stored.

At block 1160, the mobile device (e.g., processors of the mobile device) can determine whether or not the image frames have been captured around 360 degrees of the object (e.g., around the entire perimeter of the object), or whether or not the image frames have been captured as specified by the user's instructions (e.g., via the user interface), such as to only capture the back side of an object. If the mobile device determines that the image frames have not been captured accordingly, the process 1100 can proceed back to block 1140.

However, if the mobile device determines that the image frames have been captured accordingly, at block 1170, the mobile device (e.g., processors of the mobile device) can stop the capture of the image frames, and proceed to stitching the image segments together to form a single 2D image (a rollout photograph) of the object. In one or more examples, the stitching of the image segments can be performed in parallel with the capturing of the image frames of the object.

At block 1180, after 2D image of the object is formed from the stitching of the image segments, geometric (warping), illumination, and/or chromaticity corrections can be applied to the 2D image to obtain a more fluid, 2D image of the object. In one or more examples, one or more of the geometric (warping), illumination, and/or chromaticity corrections can be applied to the image frames and/or image segments prior to stitching, as these corrections may enable more accurate alignment of the image segments for stitching. At block 1190, a user can choose (e.g., via a user interface) to have an interactive volumetric 3D visualization of the image of the object.

FIG. 12 is a flow chart illustrating an example of a process 1200 for rollout photography for mobile devices. The process 1200 can be performed by a computing device or system, or by a component or system (e.g., a chipset) of the computing device or system. In some aspects, the process 1200 can be performed by the image capture and processing system 100 of FIG. 1 and/or or by a computing device (e.g., a mobile device, such as a smart phone, mobile phone, tablet computer, wearable device, drone, and/or vehicle), which may include the image capture and processing system 100.

Figure 13:
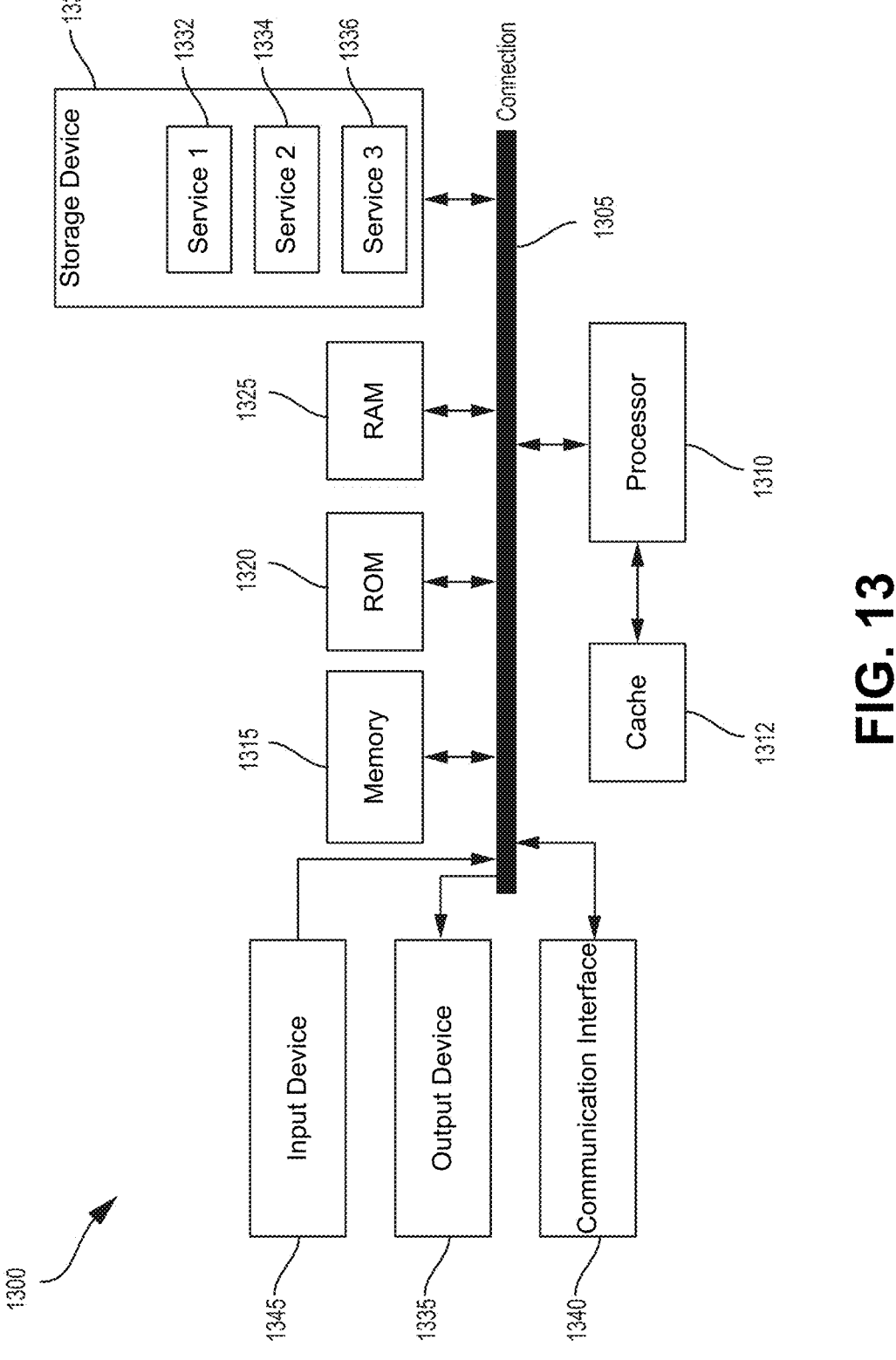
FIG. 13 is a diagram illustrating an example of a system for implementing certain aspects described herein, in accordance with some examples.

The operations of the process 1200 may be implemented as software components that are executed and run on one or more processors (e.g., the processor 1310 of FIG. 13, and/or other processor(s)). Alternatively or in combination with software components, one or more operations of the process 1200 may be implemented in specific hardware components.

At block 1210, the computing device (or component thereof) can obtain, from a camera, a plurality of image frames of an object while the computing device and/or the object is/are moving relative to each other. In some aspects, whether the computing device is moving relative to the object or the object is moving relative to the computing device is based on a capture mode (e.g., a rollout photography capture mode selected via a user interface of the computing device). In some cases, as noted above, the computing device is a mobile device. In some examples, the computing device (e.g., mobile device) includes the camera. In such examples, the computing device can obtain, by the camera of the mobile device (or other device) the plurality of image frames of the object while the mobile device and/or the object is moving relative to each other. In some aspects, the computing device (or component thereof) can determine a curvature of the object. The computing device (or component thereof) can determine, based on the curvature of the object, a capture rate (or sampling rate) for capturing the plurality of image frames. For instance, the computing device can determine a capture rate for a first object having a flat surface (with no curvature) as 30 frames per second, and can determine a capture rate for a second object having a curved surface as 60 frames per second. The greater capture rate can allow the computing device to capture a larger number of segments for a 2D image (e.g., a rollout photograph).

In some aspects, the computing device (or component thereof) can obtain the plurality of image frames of the object from the camera while the computing device is static and the object is rotated in place (e.g., as described with respect to FIG. 4). In some cases, the computing device (or component thereof) can obtain the plurality of image frames of the object from the camera while the object is rolled and the computing device is moved in at least one direction (e.g., as described with respect to FIG. 5). In some examples, the computing device (or component thereof) can obtain the plurality of image frames of the object from the camera while the object is rolled and the computing device is static (e.g., as described with respect to FIG. 6). In some aspects, the computing device (or component thereof) can obtain the plurality of image frames of the object from the camera while the object is rolled and the computing device is rotated (e.g., as described with respect to FIG. 7). In some cases, the computing device (or component thereof) can obtain the plurality of image frames of the object from the camera while the computing device is revolved around the object (e.g., as described with respect to FIG. 8).

At block 1220, the computing device (or component thereof) can determine a plurality of image segments from the plurality of image frames of the object. The plurality of image segments include a respective image segment from each image frame of the plurality of image frames.

At block 1230, the computing device (or component thereof) can combine the plurality of image segments to generate a single two-dimensional (2D) image of a surface of the object. In some aspects, to combine the plurality of image frames, the computing device (or component thereof) can stitch the plurality of image frames together to generate the single 2D image In such aspects, the computing device (or component thereof) can apply one or more post-processing corrections to the plurality of image segments prior to stitching the plurality of image frames together. In some cases, the computing device (or component thereof) can apply one or more post-processing corrections to the single 2D image. The one or more post-processing corrections applied to the plurality of image segments and/or the single 2D image can include geometric corrections, illumination corrections, chromaticity corrections, any combination thereof, and/or other post-processing corrections.

In some aspects, the computing device (or component thereof) can provide a user interface (UI) for a user to perform the rollout photography. For instance, as described herein, the computing device (or component thereof, such as a display) may display an on-screen UI to guide the user to facilitate the capture mode of choice (e.g., to guide the user to move the mobile phone and/or object appropriately for capturing the image frames). In some cases, the computing device (or component thereof) can display (or output for display), via the user interface, user guidance for capturing the plurality of image frames of the object. In some examples, the computing device (or component thereof) can display (or output for display), via the user interface, an option for a selection of one or more dimensions and/or location of an image subsection of the object for the plurality of image segments. In some aspects, the computing device (or component thereof) can display (or output for display), via the user interface, a subsection guide (e.g., subsection guide 1010) to guide capture of an image from the plurality of image frames such that a subsection of the object for an image segment is included in the image. In some cases, the computing device (or component thereof) can receive, via the user interface, user input associated with at least one adjustment of the subsection guide. The computing device (or component thereof) can adjust the subsection guide based on the user input. For instance, as described with respect to FIG. 10, a subsection guide 1010 can be displayed, which is adjustable by the user via the user interface. The user can provide user input via the user interface to change the dimensions (e.g., the width and/or height, the size, the shape, etc.) and/or location of the subsection of the captured image frame of the object 1020.

In some cases, the computing device (or component thereof) can determine a segment for an image of the plurality of image frames based on a depth of a subsection of the image corresponding to the segment. For instance, as described with respect to FIG. 10, the computing device (or component thereof) can determine a subsection based on a depth estimation map 1015.

As noted above, the process 1200 may be performed by one or more computing devices or apparatuses. In some illustrative examples, the process 1200 can be performed by the image capture and processing system 100 of FIG. 1 (e.g., which may be within a mobile device), and/or one or more computing devices or systems (e.g., the computing system 1300 of FIG. 13). In some cases, such a computing device or apparatus may include a processor, microprocessor, microcomputer, or other component of a device that is configured to carry out the steps of the process 1200. In some examples, such computing device or apparatus may include one or more sensors configured to capture image data. For example, the computing device can include a mobile device, such as a smartphone, a head-mounted display, a tablet computer, a wearable device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1200 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including the memory unit 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output. The communication interface May perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined system or component (e.g., a system-on-chip).

Illustrative aspects of the disclosure include:

Aspect 1. An apparatus for performing rollout photography, the apparatus comprising: at least one memory; and at least one processor coupled to the at least one memory and configured to: obtain, from a camera, a plurality of image frames of an object while at least one of the apparatus or the object is moving relative to each other; determine a plurality of image segments from the plurality of image frames of the object, the plurality of image segments including a respective image segment from each image frame of the plurality of image frames; and combine the plurality of image segments to generate a single two-dimensional (2D) image of a surface of the object.

Aspect 2. The apparatus of Aspect 1, wherein, to combine the plurality of image frames, the at least one processor is configured to stitch the plurality of image frames together to generate the single 2D image.

Aspect 3. The apparatus of Aspect 2, wherein the at least one processor is configured to apply one or more post-processing corrections to the plurality of image segments prior to stitching the plurality of image frames together.

Aspect 4. The apparatus of any one of Aspects 1 to 3, wherein the at least one processor is configured to apply one or more post-processing corrections to the single 2D image.

Aspect 5. The apparatus of Aspect 4, wherein the one or more post-processing corrections comprise at least one of geometric corrections, illumination corrections, or chromaticity corrections.

Aspect 6. The apparatus of any one of Aspects 1 to 5, wherein the at least one processor is configured to obtain the plurality of image frames of the object from the camera while the apparatus is static and the object is rotated in place.

Aspect 7. The apparatus of any one of Aspects 1 to 6, wherein the at least one processor is configured to obtain the plurality of image frames of the object from the camera while the object is rolled and the apparatus is moved in at least one direction.

Aspect 8. The apparatus of any one of Aspects 1 to 7, wherein the at least one processor is configured to obtain the plurality of image frames of the object from the camera while the object is rolled and the apparatus is static.

Aspect 9. The apparatus of any one of Aspects 1 to 8, wherein the at least one processor is configured to obtain the plurality of image frames of the object from the camera while the object is rolled and the apparatus is rotated.

Aspect 10. The apparatus of any one of Aspects 1 to 9, wherein the at least one processor is configured to obtain the plurality of image frames of the object from the camera while the apparatus is revolved around the object.

Aspect 11. The apparatus of any one of Aspects 1 to 10, wherein the at least one processor is configured to: determine a curvature of the object; and determine, based on the curvature of the object, a capture rate for capturing the plurality of image frames.

Aspect 12. The apparatus of any one of Aspects 1 to 11, wherein the at least one processor is configured to provide a user interface for a user to perform the rollout photography.

Aspect 13. The apparatus of Aspect 12, wherein the at least one processor is configured to output, for display via the user interface, user guidance for capturing the plurality of image frames of the object.

Aspect 14. The apparatus of any one of Aspects 12 or 13, wherein the at least one processor is configured to output, for display via the user interface, an option for a selection of at least one of one or more dimensions or a location of an image subsection of the object for the plurality of image segments.

Aspect 15. The apparatus of any one of Aspects 12 to 14, wherein the at least one processor is configured to output, for display via the user interface, a subsection guide to guide capture of an image from the plurality of image frames such that a subsection of the object for an image segment is included in the image.

Aspect 16. The apparatus of Aspect 15, wherein the at least one processor is configured to: receive, via the user interface, user input associated with at least one adjustment of the subsection guide; and adjust the subsection guide based on the user input.

Aspect 17. The apparatus of any one of Aspects 1 to 16, wherein the at least one processor is configured to: determine a segment for an image of the plurality of image frames based on a depth of a subsection of the image corresponding to the segment.

Aspect 18. The apparatus of any one of Aspects 1 to 17, wherein whether the apparatus is moving relative to the object or the object is moving relative to the apparatus is based on a capture mode.

Aspect 19. The apparatus of any one of Aspects 1 to 18, further comprising the camera.

Aspect 20. The apparatus of any one of Aspects 1 to 19, wherein the apparatus is a mobile device.

Aspect 21. A method for performing rollout photography, the method comprising: obtaining, by a camera of a mobile device, a plurality of image frames of an object while at least one of the mobile device or the object is moving relative to each other; determining, by one or more processors of the mobile device, a plurality of image segments from the plurality of image frames of the object, the plurality of image segments including a respective image segment from each image frame of the plurality of image frames; and combining, by the one or more processors of the mobile device, the plurality of image segments to generate a single two-dimensional (2D) image of a surface of the object.

Aspect 22. The method of Aspect 21, wherein combining the plurality of image frames comprises stitching the plurality of image frames together to generate the single 2D image.

Aspect 23. The method of Aspect 22, further comprising applying, by the one or more processors of the mobile device, one or more post-processing corrections to the plurality of image segments prior to stitching the plurality of image frames together.

Aspect 24. The method of any one of Aspects 21 to 23, further comprising applying, by the one or more processors of the mobile device, one or more post-processing corrections to the single 2D image.

Aspect 25. The method of Aspect 24, wherein the one or more post-processing corrections comprise at least one of geometric corrections, illumination corrections, or chromaticity corrections.

Aspect 26. The method of any one of Aspects 21 to 25, wherein the plurality of image frames of the object are captured by the camera while the mobile device is static and the object is rotated in place.

Aspect 27. The method of any one of Aspects 21 to 26, wherein the plurality of image frames of the object are captured by the camera while the object is rolled and the mobile device is moved in at least one direction.

Aspect 28. The method of any one of Aspects 21 to 27, wherein the plurality of image frames of the object are captured by the camera while the object is rolled and the mobile device is static.

Aspect 29. The method of any one of Aspects 21 to 28, wherein the plurality of image frames of the object are captured by the camera while the object is rolled and the mobile device is rotated.

Aspect 30. The method of any one of Aspects 21 to 29, wherein the plurality of image frames of the object are captured by the camera while the mobile device is revolved around the object.

Aspect 31. The method of any one of Aspects 21 to 30, further comprising: determining, by the one or more processors, a curvature of the object; and determining, based on the curvature of the object, a capture rate for capturing the plurality of image frames.

Aspect 32. The method of any one of Aspects 21 to 31, further comprising providing, by the mobile device, a user interface for a user to perform the rollout photography.

Aspect 33. The method of Aspect 32, further comprising displaying, via the user interface, user guidance for capturing the plurality of image frames of the object.

Aspect 34. The method of any one of Aspects 32 or 33, further comprising displaying, via the user interface, an option for a selection of at least one of one or more dimensions or a location of an image subsection of the object for the plurality of image segments.

Aspect 35. The method of any one of Aspects 32 to 34, further comprising displaying, via the user interface, a subsection guide to guide capture of an image from the plurality of image frames such that a subsection of the object for an image segment is included in the image.

Aspect 36. The method of Aspect 35, further comprising: receiving, via the user interface, user input associated with at least one adjustment of the subsection guide; and adjusting the subsection guide based on the user input.

Aspect 37. The method of any one of Aspects 21 to 36, further comprising: determining a segment for an image of the plurality of image frames based on a depth of a subsection of the image corresponding to the segment.

Aspect 38. The method of any one of Aspects 21 to 37, wherein whether the mobile device is moving relative to the object or the object is moving relative to the mobile device is based on a capture mode.

Aspect 39. A non-transitory computer-readable storage medium comprising instructions stored thereon which, when executed by at least one processor, causes the at least one processor to perform operations according to any one of Aspects 21 to 38.

Aspect 40. An apparatus for performing rollout photography, comprising one or more means for performing operations according to any one of Aspects 21 to 38.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for performing rollout photography, the apparatus comprising:
   at least one memory; and
   at least one processor coupled to the at least one memory and configured to:
   obtain, from a camera, a plurality of image frames of an object while at least one of the apparatus or the object is moving relative to each other;
   determine a capture rate for capturing the plurality of image frames based on a curvature of the object;
   capture the plurality of image frames based on the capture rate;
   determine a plurality of image segments from the plurality of image frames of the object based on the capture rate, the plurality of image segments including a respective image segment from each image frame of the plurality of image frames; and
   combine the plurality of image segments to generate a single two-dimensional (2D) image of a surface of the object.

2. The apparatus of claim 1, wherein, to combine the plurality of image frames, the at least one processor is configured to stitch the plurality of image frames together to generate the single 2D image.

3. The apparatus of claim 2, wherein the at least one processor is configured to apply one or more post-processing corrections to the plurality of image segments prior to stitching the plurality of image frames together.

4. The apparatus of claim 1, wherein the at least one processor is configured to apply one or more post-processing corrections to the single 2D image.

5. The apparatus of claim 4, wherein the one or more post-processing corrections comprise at least one of geometric corrections, illumination corrections, or chromaticity corrections.

6. The apparatus of claim 1, wherein the at least one processor is configured to obtain the plurality of image frames of the object from the camera while the apparatus is static and the object is rotated in place.

7. The apparatus of claim 1, wherein the at least one processor is configured to obtain the plurality of image frames of the object from the camera while the object is rolled and the apparatus is moved in at least one direction.

8. The apparatus of claim 1, wherein the at least one processor is configured to obtain the plurality of image frames of the object from the camera while the object is rolled and the apparatus is static.

9. The apparatus of claim 1, wherein the at least one processor is configured to obtain the plurality of image frames of the object from the camera while the object is rolled and the apparatus is rotated.

10. The apparatus of claim 1, wherein the at least one processor is configured to obtain the plurality of image frames of the object from the camera while the apparatus is revolved around the object.

11. The apparatus of claim 1, wherein the at least one processor is configured to:
   determine a curvature of the object; and
   determine, based on the curvature of the object, a capture rate for capturing the plurality of image frames.

12. The apparatus of claim 1, wherein the at least one processor is configured to provide a user interface for a user to perform the rollout photography.

13. The apparatus of claim 12, wherein the at least one processor is configured to output, for display via the user interface, user guidance for capturing the plurality of image frames of the object.

14. The apparatus of claim 12, wherein the at least one processor is configured to output, for display via the user interface, an option for a selection of at least one of one or more dimensions or a location of an image subsection of the object for the plurality of image segments.

15. The apparatus of claim 12, wherein the at least one processor is configured to output, for display via the user interface, a subsection guide to guide capture of an image from the plurality of image frames such that a subsection of the object for an image segment is included in the image.

16. The apparatus of claim 15, wherein the at least one processor is configured to:
   receive, via the user interface, user input associated with at least one adjustment of the subsection guide; and
   adjust the subsection guide based on the user input.

17. The apparatus of claim 1, wherein the at least one processor is configured to:
   determine a segment for an image of the plurality of image frames based on a depth of a subsection of the image corresponding to the segment.

18. The apparatus of claim 1, wherein whether the apparatus is moving relative to the object or the object is moving relative to the apparatus is based on a capture mode.

19. The apparatus of claim 1, further comprising the camera.

20. The apparatus of claim 1, wherein the apparatus is a mobile device.

21. A method for performing rollout photography, the method comprising:

determining a capture rate for obtaining a plurality of image frames based on a curvature of an object;

obtaining, based on the capture rate and by a camera of a mobile device, a plurality of image frames of an object while at least one of the mobile device or the object is moving relative to each other;

determining, by one or more processors of the mobile device, a plurality of image segments from the plurality of image frames of the object based on the capture rate, the plurality of image segments including a respective image segment from each image frame of the plurality of image frames; and combining, by the one or more processors of the mobile device, the plurality of image segments to generate a single two-dimensional (2D) image of a surface of the object.

22. The method of claim 21, wherein combining the plurality of image frames comprises stitching the plurality of image frames together to generate the single 2D image.

23. The method of claim 22, further comprising applying, by the one or more processors of the mobile device, one or more post-processing corrections to the plurality of image segments prior to stitching the plurality of image frames together.

24. The method of claim 21, wherein the plurality of image frames of the object are captured by the camera while the mobile device is static and the object is rotated in place.

25. The method of claim 21, wherein the plurality of image frames of the object are captured by the camera while the object is rolled and the mobile device is moved in at least one direction.

26. The method of claim 21, wherein the plurality of image frames of the object are captured by the camera while the object is rolled and the mobile device is static.

27. The method of claim 21, wherein the plurality of image frames of the object are captured by the camera while the object is rolled and the mobile device is rotated.

28. The method of claim 21, wherein the plurality of image frames of the object are captured by the camera while the mobile device is revolved around the object.

29. The method of claim 21, further comprising:

determining, by the one or more processors, a curvature of the object; and determining, based on the curvature of the object, a capture rate for capturing the plurality of image frames.

30. The method of claim 21, further comprising displaying, via a user interface, at least one of user guidance for capturing the plurality of image frames of the object, an option for a selection of at least one of one or more dimensions or a location of an image subsection of the object for the plurality of image segments, or a subsection guide to guide capture of an image from the plurality of image frames such that a subsection of the object for an image segment is included in the image.

* * * * *